United States Patent
Bauder et al.

(10) Patent No.: US 9,360,998 B2
(45) Date of Patent: Jun. 7, 2016

(54) SELECTION AND ORGANIZATION BASED ON SELECTION OF X-Y POSITION

(71) Applicant: PayPal, Inc., San Jose, CA (US)

(72) Inventors: Russell Bauder, San Jose, CA (US); Egan Schulz, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 197 days.

(21) Appl. No.: 13/664,995

(22) Filed: Oct. 31, 2012

(65) Prior Publication Data

US 2013/0117713 A1 May 9, 2013

Related U.S. Application Data

(60) Provisional application No. 61/554,085, filed on Nov. 1, 2011.

(51) Int. Cl.

| | | |
|---|---|---|
| G06F 3/048 | (2013.01) | |
| G06F 3/0482 | (2013.01) | |
| G06Q 10/06 | (2012.01) | |
| G06Q 20/12 | (2012.01) | |
| G06Q 20/20 | (2012.01) | |
| G06Q 20/34 | (2012.01) | |
| G07F 9/02 | (2006.01) | |

(52) U.S. Cl.
CPC ........ *G06F 3/0482* (2013.01); *G06Q 10/06311* (2013.01); *G06Q 20/123* (2013.01); *G06Q 20/20* (2013.01); *G06Q 20/356* (2013.01); *G07F 9/023* (2013.01)

(58) Field of Classification Search
CPC .. G06F 3/0482; G06F 3/0481; H04N 5/44543
USPC .................................................. 715/810, 768
See application file for complete search history.

(56) References Cited

U.S. PATENT DOCUMENTS

| | | | |
|---|---|---|---|
| 5,760,773 A * | 6/1998 | Berman et al. ................. 715/808 |
| 7,818,672 B2 * | 10/2010 | McCormack et al. ......... 715/715 |
| 8,442,844 B1 * | 5/2013 | Trandal et al. ..................... 705/4 |
| 2002/0147740 A1 * | 10/2002 | Faraday ................ G06F 3/0481 715/202 |
| 2005/0154989 A1 * | 7/2005 | Maddocks ............ G06F 3/0482 715/735 |
| 2009/0113474 A1 * | 4/2009 | Green ................ H04N 5/44543 725/39 |
| 2009/0193351 A1 * | 7/2009 | Lee et al. ....................... 715/769 |
| 2010/0159898 A1 * | 6/2010 | Krzyzanowski et al. .. 455/414.1 |
| 2011/0154259 A1 * | 6/2011 | Kennedy et al. ............... 715/811 |
| 2011/0320977 A1 * | 12/2011 | Bahn et al. ..................... 715/810 |
| 2012/0032945 A1 * | 2/2012 | Dare et al. ..................... 345/418 |

* cited by examiner

*Primary Examiner* — Andrew Tank
*Assistant Examiner* — Jian Yu
(74) *Attorney, Agent, or Firm* — Haynes and Boone, LLP

(57) ABSTRACT

An X-Y interaction (XYI) facilitates rapid relationship pairing by creating tap or selection zones that intersect variables. The y-axis contains an indefinite number of variables (items) that can be assigned to x-axis variables (groups). "Items" are individual bits of information or data, like a transaction, song, item, or a to-do task. "Groups" are predefined buckets that apply specific rules or actions or represent specific things or people. Items get assigned to groups, and then the rules are applied to them. Items along the y-axis can be organized based on where along an x-axis a user selects an item. The selection can be by tapping, and one item can be selected for multiple groups.

15 Claims, 10 Drawing Sheets

SELECTION AND ORGANIZATION BASED ON SELECTION OF X-Y POSITION

CROSS REFERENCE TO RELATED APPLICATION

The present application claims priority to U.S. Provisional Patent Application Ser. No. 61/554,085, filed Nov. 1, 2011.

BACKGROUND

1. Technical Field

The present application generally relates to display devices and more particularly to selecting and managing information on a display device.

2. Related Art

Display devices, such as PCs, smart phones, computing tablets, and the like are capable of displaying all sorts of different information. Typically, the information is viewed by the user and actions may be performed, such as retrieving additional content/information, exchanging information, making a payment, making a purchase, etc. The information may be organized through specific products or apps that allow the user to manage the information. For example, a spreadsheet may enable a user to store, track, and manage data.

However, such products or apps may be cumbersome or hard for a typical user to use effectively.

DETAILED DESCRIPTION

An X-Y interaction (XYI) facilitates rapid relationship pairing by creating tap or selection zones that intersect variables. The y-axis contains an indefinite number of variables (items) that can be assigned to x-axis variables (groups or actions). "Items" are individual bits of information or data, like a transaction, song, item, or a to-do task. "Groups" or "actions" (used interchangeably herein) are predefined buckets that apply specific rules or actions or represent specific things or people. Items get assigned to groups, and then the rules are applied to them. Items along the y-axis can be organized based on where along an x-axis a user selects an item. The selection can be by tapping, and one item can be selected for multiple groups.

A user is presented with a plurality of items along the y-axis and a plurality of groups along the x-axis on a display of a user device, such as a tablet, smart phone, PC, or the like. Note that items may be presented along the x-axis, and groups placed along the y-axis. The items and groups may be created (e.g., selected) and arranged by the user or pre-populated by a service provider, such as PayPal, Inc. of San Jose, Calif. The following description will focus on a touch screen display, such as on an iPad tablet from Apple. However, as those of ordinary skill in the art will appreciate, other displays and devices may also be suitable. For example, instead of touching or tapping a portion of the screen, a user may move a pointer, such as with a mouse or trackball, to a portion of the screen and click on that portion to select.

Once the user is presented with the items and groups, the user may quickly and easily organize items by tapping the appropriate intersection of an item with a desired group. Multiple items can be selected for a single group, and a single item can be selected for multiple groups. The selected items or groups can then be selected to display only the selected items or groups. As a result, items can be organized, groups of items created, and appropriate actions taken (automatically or triggered by a user) with the groups.

Figure 1:
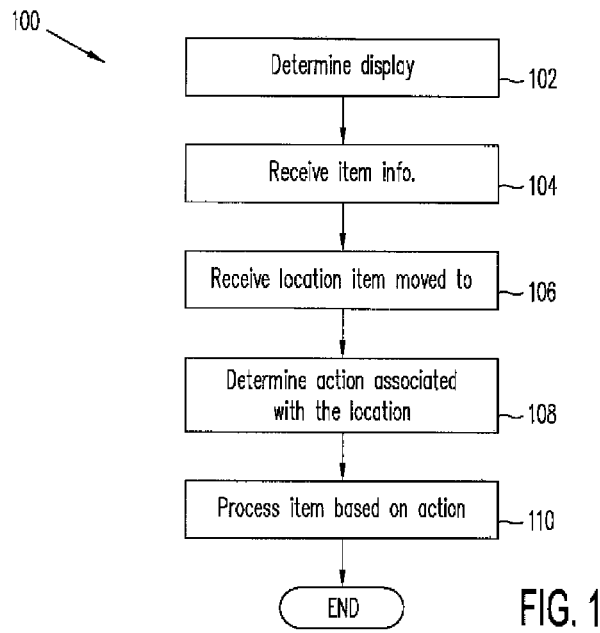
FIG. 1 is a flowchart showing a process a service provider makes in conducting an X-Y intersection transaction according to one embodiment.

FIG. 1 is a flowchart showing a process 100 a service provider performs to process an action based on item placement according to one embodiment. At step 102, the service provider, which can be a payment provider like PayPal, Inc. of San Jose, Calif., or other provider of online services, determines a display to present to the user on a user device. The user device, in one embodiment, is a touch screen computing tablet. In other embodiments, the user device may be a smart phone, PC, laptop, or other computing device with a display. In one embodiment, the display contains a column (or y-axis) of items to be acted on and a row (or x-axis) of actions to be performed on or with one or more of the items. The items may span the entire width or a partial width of the display. The actions are thus arranged in columns horizontally across the width of the display. Examples of items and actions will be provided below.

The type of items and/or actions may depend on the service provided or content stored with the user account with the service provider. For example, in the fanner case, the service provider may be a payment services provider, and the user is an employee of the payment services provider if the employee's responsibility is to handle dispute from customers, the items may be individual disputes, and the actions may be different actions that can be taken for the disputes, such as full refund, partial refund, deny refund, follow up with merchant and/or customer, etc.

The type of items and/or actions may depend on a user selection. For example, the user may have different types of data or items to be managed in different ways. Thus, the user may select the data/item set from the user account, which would aid the merchant in determining the display, e.g., the appropriate items/data in one direction and the appropriate actions in the other direction. Note that items may be arranged along the y-axis and actions along the x-axis if desired, such as depending on the number of items, the number of actions, and/or the dimensions of the user display device.

Once a display is determined, the display is presented to the user on the user device. The user is able to move items to specific locations on the display, where the location determines the action to be performed on the item(s). In some embodiments, only one item can be associated with one action, while in other embodiments, a plurality of items can be associated with a single action or a single item can be associated with a plurality of actions. The user can move a desired item(s) to a desired location corresponding to an action by dragging and dropping the item(s), clicking on the item(s), moving the item(s), and then unclicking the item(s) at the desired location, tapping on a desired intersection of an item and an action, or other suitable means for associating an item with a location on a device display.

The image or item movement is then communicated to the service provider at step 104. For example, the service provider may know where each item is located initially on the display and where an item ends up, based on spatial location. The initial location of the item being moved can be determined, which allows the service provider to know what that item is, based on the spatial location on the display.

The item is then moved to an end location on the display, which is received by the service provider at step 106. The location where the item ends up corresponds to an action. Thus, the service provider can associate, such as by a lookup, the end location of the moved item to a particular action based on the detected location of the moved item on the display to determine the action, at step 108.

Once the action(s) and the item(s) are determined, the service provider processes the item(s) accordingly at step 110. Some examples below and in FIGS. 3A-3G illustrate, but are not limiting, a few practical use cases of items and actions.

Figure 2:
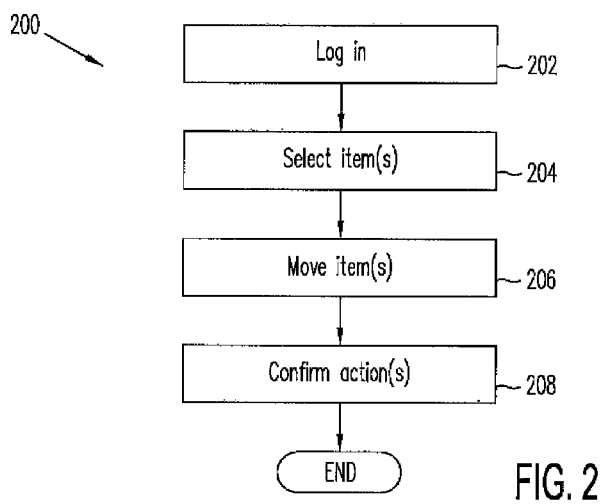
FIG. 2 is a flowchart showing a process a user makes in conducting an X-Y intersection transaction according to one embodiment.

FIG. 2 is a flowchart showing a process 200 a user performs to process an action based on item placement according to one embodiment. At step 202, the user logs into a user account with the service provider. The user may access a mobile app or a service provider site through a user device. Login may include entering a user identifier, such as a user name, email address, or phone number, and a password or PIN through the mobile app or site.

Once logged in, the user may see a home page with options or tabs that the user can select to view a specific display of actions and items. For example, there may be an item management tab that allows the user to view one or more displays with different items and actions. The various displays may have user-specified names for easy identification. Once a desired display is selected, the user will see one or more items, each item being associated with a specific location on the display, and one or more actions, each action being associated with a specific location on the display. Note that in other embodiments, the user does not have to log in to conduct an XYI.

At step 204, the user selects one or more desired item(s) from the display. In one embodiment, the user taps one or more items for selection. In another embodiment, the user clicks on or checks a box associated with one or more desired items. The items may be located vertically in the display and may span the entire width or partial width of the display. The items may have a textual description and/or a visual description or indicator. In other embodiments, the items may be positioned horizontally along the display and span all or part of the height of the display.

Once selected, the user moves the one or more selected items at step 206. In one embodiment, the user moves the item or items (individually or as a group) to a location on the display corresponding to a desired action for the item(s). With a touch screen, the user places a finger on the item or items and moves the finger to the desired location on the screen. Upon removing the finger from the screen, the item(s) are dropped to their desired location. In another embodiment, the user uses a mouse or trackball to move the item(s). Other moving means may also be suitable, depending on the device type. Actions for the items may be shown along the x-axis along the width of the display or along a y-axis along the length or height of the display.

After the user has placed the desired item(s) to one or more locations corresponding to actions, the user may be asked to confirm the process or action at step 208. For example, the user may be shown a box that summarizes the actions, which may include selected items, and a button, link, or box the user can select to confirm the action. The action(s) may then be performed on the selected item(s) and the results shown to the user on the user device. Note that one or more steps described herein may be omitted, combined, or performed in a different sequence as desired or suitable. The following provides some non-limiting examples of actions and items.

Managing Disputes

The disputes may come from customers of a merchant through an email, website, a dispute handling area of the merchant, or other means. Typically, the merchant may then be required to decide which of several actions to take on the dispute. This can be time-consuming, as each dispute may need to be handled individually before moving onto another dispute.

In one embodiment, merchants (or users) may assign disputes (items) to common actions (groups). In one embodiment, actions are along headers of different columns of the x-axis, such as full refund, partial refund, no refund, and message. Items, such as refund requests from different users and transactions, are shown in rows along the y-axis. The items may span the entire row or only a portion of the row. By tapping or selecting a portion of the item under a specific header, the action is selected for that item. For example, if first, third, fourth, and eighth requests are full refund requests, they are tapped at an intersection of a first column representing full refunds. Also, if the third and an eighth request require a message back, the portions of the third and eighth requests intersecting with a fourth column representing "message" is tapped. All full refund requests can then be organized easily, along with other requests all within one screen. Thus, with many different actions on an x-axis and items to sort/organize on the y-axis, a user can quickly and easily organize/create.

Figure 3A:
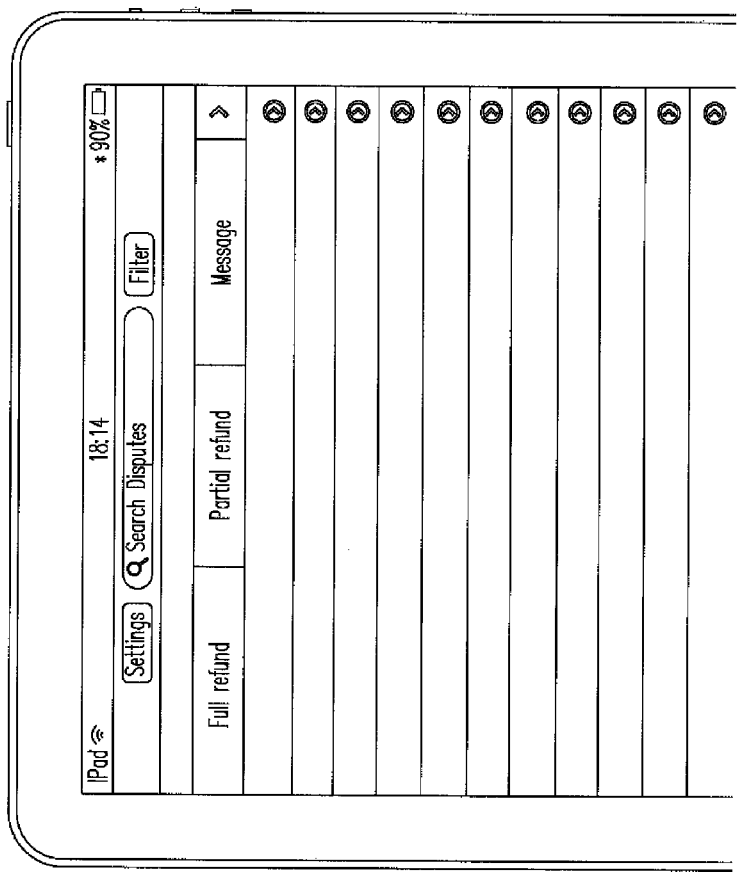
FIGS. 3A-3G are exemplary screen shots a user may see in an X-Y interaction transaction according to one embodiment.

FIG. 3A shows a tablet having three groups or actions (various ways to handle a dispute, shown here as full refund, partial refund, message) along the x-axis. The user may add, delete, or otherwise revise the actions as desired, either directly or through a service provider. The user may also re-order the actions, such as by moving an action to a desired location by dragging and dropping.

Figure 3B:
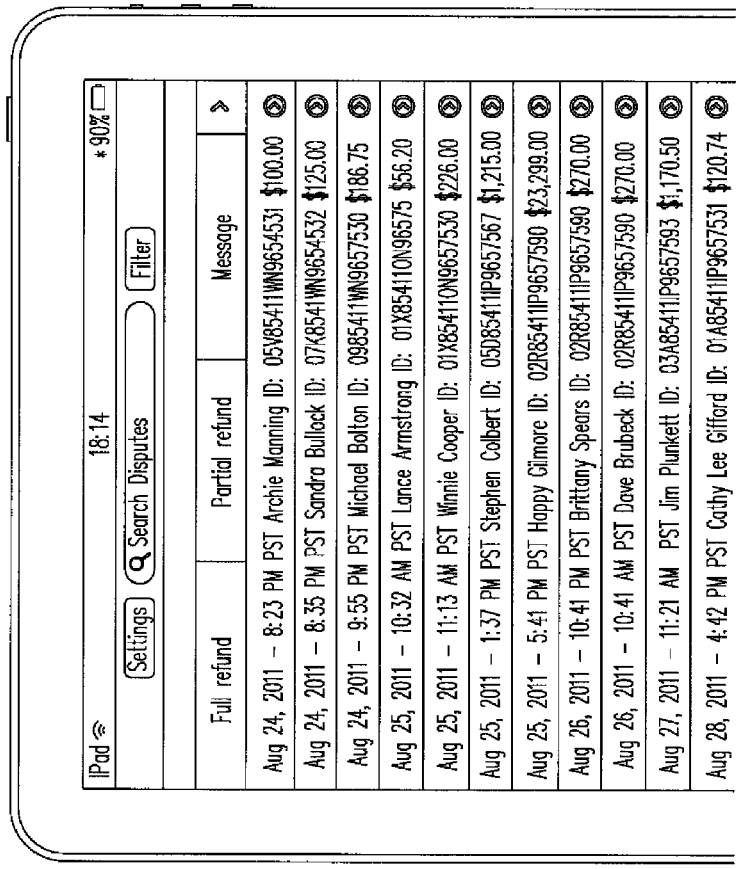

FIG. 3B shows the tablet having many items or disputes along the y-axis. This may be populated as disputes come in, at the end of the day during a settlement period, or some other period and can be by the merchant or a service provider. As seen, each dispute or item provides information about the dispute, such as date submitted or received, name of the person submitting the dispute, the identification number associated with the dispute, and the amount of the dispute. The dispute spans the entire row, as shown. However, in other embodiment, items may only span a portion of the row.

Figure 3C:
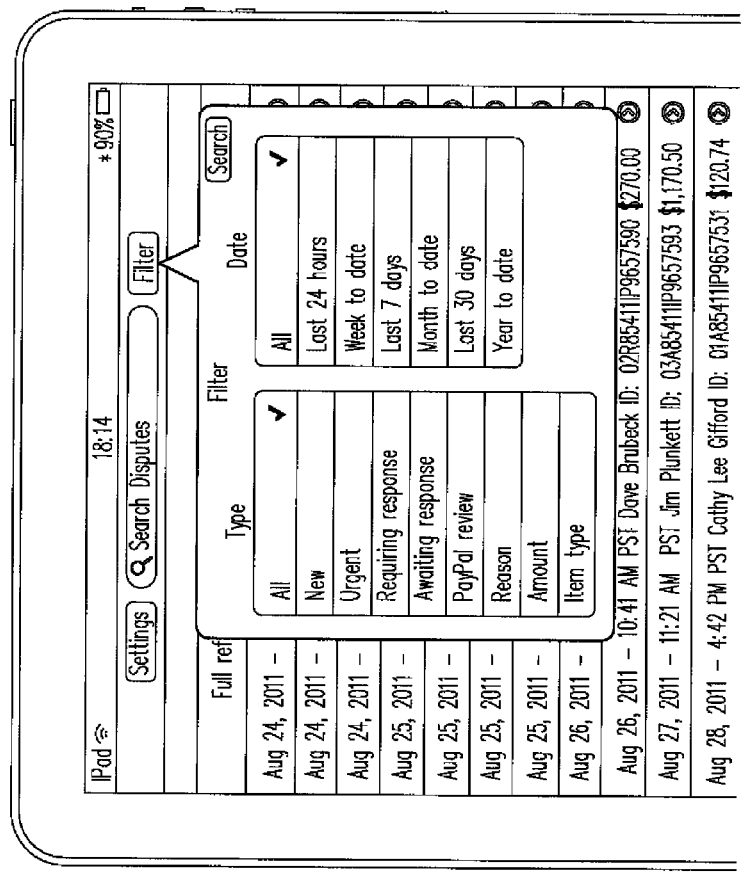

FIG. 3C shows a screen that allows the user to filter the items on the display. The filter can be specific to the type of item being presented. In this example, the filters can be the type of dispute (e.g., all, new, urgent, etc.) and the date the dispute was submitted (e.g., all, last 24 hours, etc.). The type of dispute may have been tagged for each dispute when the dispute was submitted, such as automatically by the merchant/service provider or by a dispute resolution center.

Figure 3D:
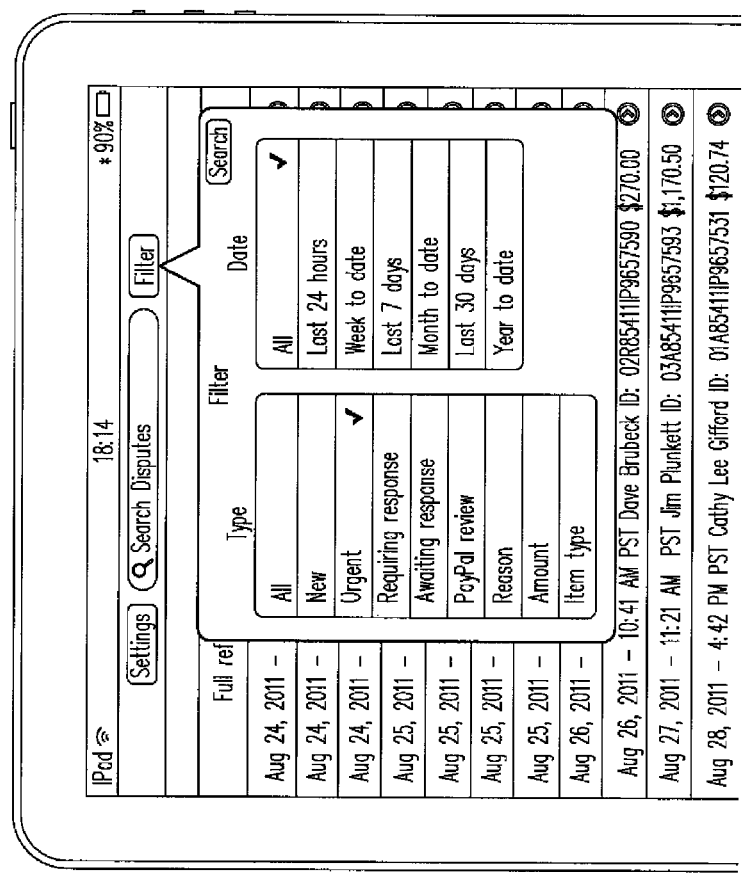

FIG. 3D shows that the user has selected only urgent disputes, regardless of date submitted, to be shown. This may be accomplished by the user tapping the "Urgent" row. The user may be confined to select only one type and one date restrictor, but in other embodiments, multiple types may be selected.

Figure 3E:
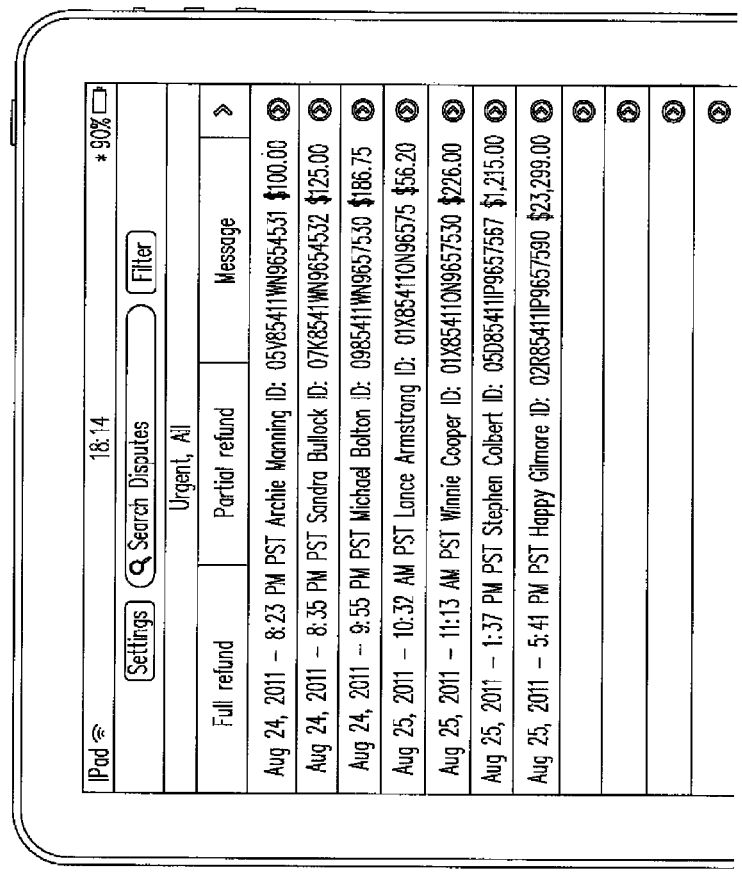

FIG. 3E shows the results after filtering, where only the "urgent" disputes are now displayed. The user may then more easily navigate the disputes for appropriate action. For example, the user now sees only the urgent disputes and can decide which action(s) each dispute is to have, such as by tapping the desired action at a desired location on the x-axis.

Figure 3F:
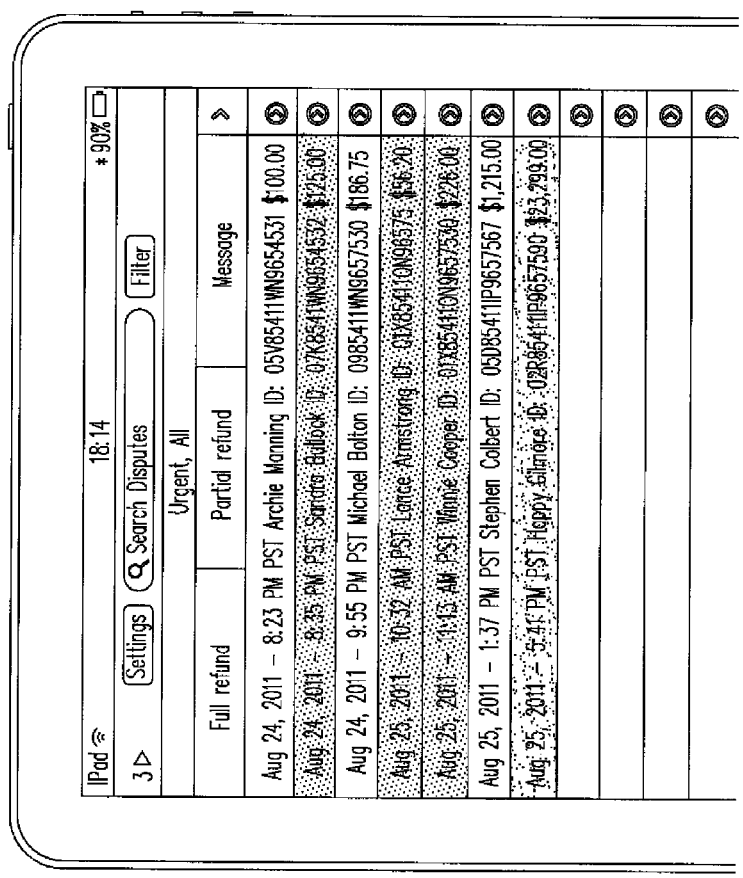

FIG. 3F shows four items selected, three of which are for full refunds and one of which is for a partial refund. For the three disputes selected for full refund processing, the user taps the dispute row at a location underneath the full refund column, i.e., along the general area of the date/time portion of the dispute. FIG. 3F shows the second, fourth, and fifth disputes selected this way. The seventh and last dispute is selected for partial refund processing by tapping the dispute row at a location underneath the partial refund column, i.e., along the general area of the disputing party's name. The item can then be highlighted the same color as the action.

Each item or dispute can also be selected for multiple actions if desired or applicable. For example, the last dispute selected for a partial refund processing may also be selected to have a message sent, such as by tapping the location under the message column, i.e., along the general area of the dispute ID and dispute amount. The number of each item for each action is shown as well (three items for full refund and one item for partial refund). The user may then select or tap a desired action to enable or initiate the action.

Figure 3G:
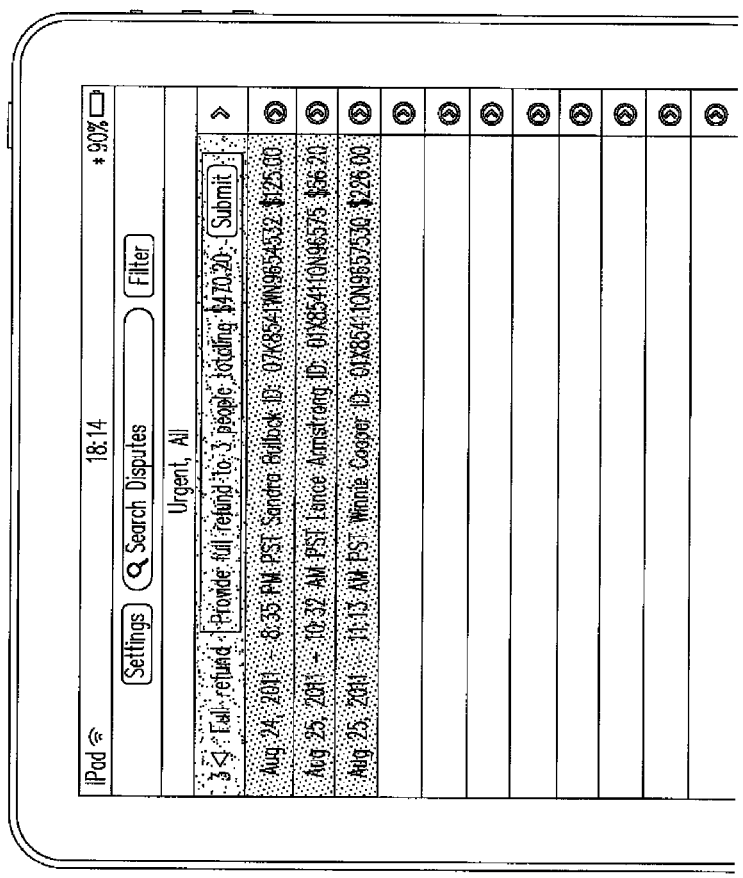

FIG. 3G shows a display after the user has tapped the full refund action. As seen, only the items selected for full refund processing are shown. The user can then approve or proceed with processing by selecting or tapping the "Submit" button. If the user wishes to change anything or go back to the previous screen, the user can tape the back arrow button to see the previous screen.

Managing To-Do Lists

A user may create an indefinite amount of to-do tasks (items) and then assign them to desired groups. For example, if the user is managing his own to-do list or for another individual, the user may assign tasks to specific days of the week, month, or other time period (groups or actions). If the user is managing a series of tasks for a plurality of people to do, the user may assign tasks to specific people (groups or actions).

The user may enter or select a series of tasks for display along the y-axis. The desired groups may be entered or selected as well and shown along the x-axis. In one example, the user is a mother, assigning tasks or chores (item) to a plurality of family members (group). The items may be mowing the lawn (item #1), vacuuming the house (item #2), helping chop vegetables (item #3), taking out the trash (item #4), and watering the lawn (item #5). The group may include a first son (group #1), a second son (group #2), a daughter (group #3), a husband (group #4), and the mom herself (group #5). Mom may tap the intersection between an item (task) and the group (family member), therein assigning it to get done by the desired person. Multiple tasks may be assigned to a single family member. The tasks may be filtered first, such as by estimated time to complete the task, urgency, difficulty (represented by age group the task should be performed by), etc.

Once organized, the user may select the group or family member for further action. For example, if Mom selects group #3 (the daughter), the items or tasks selected for the daughter may be sent to the daughter, such as by text or email to the daughter's smart phone, or be placed onto the daughter's electronic calendar. Note that the family members may also be displayed or viewed as items and the chores or tasks may be displayed or viewed as actions, such that the user can drag and drop desired family members to assign them to specific chores.

Creating Playlists

Songs could be y-axis items, and playlists could be x-axis groups or actions. The user may select songs for the items, such as from the user's music library or through a music service. The songs may be represented as audio files or clips, a textual description (such as name, artist, album), or other identifier. The playlists may be created by the user, such as "Party," "Sinatra," "Slow Jazz," "Disco," "Kid's Birthday," "Dinner Music," etc.

The user may then quickly swipe through the songs, and tap the desired intersection to assign a song (item) to a playlist (group). The songs may have filters applied, such as by date, genre, artist, type (e.g., instrumental, vocal), etc. Selected songs may be assigned to multiple playlists. Once completed, the user may select a desired playlist for additional action. For example, the user may be shown the list of selected songs, which can then be processed to create the playlist on the user's device. This can also be done automatically. Thus, an action of creating a playlist can be performed on selected songs (items).

Organizing Messages

Messages, such as emails or texts, may be displayed along the y-axis as items, and folders may be displayed along the x-axis as groups or actions. This feature may be an option selectable by the user from the user's email account. Emails in a user's inbox may be displayed, indicating the subject header, sender, time/day sent, and indication of any attachments. Folders may be created by the user and displayed as folder names. The user may then tap the desired email at the desired intersection to place the email into the appropriate folder.

A filter may be applied to the emails, such as by date sent, size, sender name, sender domain address, etc. In one embodiment, the use may select an email to be placed in multiple folders. In such a case, the system may generate one or more copies of the email so that multiple copies of the same email can be placed in multiple folders. Once done, the display may revert to a standard email format. Thus, an action of organizing or populating a folder can be performed on selected emails or texts (items).

Routing Tasks

Transactions, actions, or accounts (items) can be organized and routed to the appropriate person or team (group or action) for handling. For example, a user may be a person at a company in charge of routing incoming emails or messages received from the company's website to a desired person or department. The emails or messages (items) may be items along the y-axis, and different people or departments (groups) may be shown along the x-axis. The emails or messages may be filtered, such as by time sent, how sent (by email or through website), etc.

The user may then select desired emails or messages to be sent to the appropriate group for handling. For example, suspicious transactions or emails may be tapped at a location corresponding to a fraud person or group, information requests may be tapped for routing to a product/service group, and requests for payment may be routed to an accounts payable group. Once selected for a group, the message or transaction may be immediately sent, such as by email, to the group or a batch may be sent after the user has finished routing some or all of the messages. As a result, specific groups may be able to receive immediately and handle only those messages they are meant to handle.

Tasks can also be routed more like a system work flow (like packets of data that represent something, like a work order, assignment, transaction, etc.). These would be the items, which can then be selected for specific groups or individuals for handling (group). Thus, an action of routing to a specific group or person is performed on selected data, such as transactions, actions, emails, etc. (items) for handling.

Educating

Questions or statements (items) may be displayed along the y-axis, and answers or responses may be displayed along the x-axis. Questions or statements may be filtered, such as by difficulty, age group, subject matter, etc. The responses may be "true", "false", and "don't know". The user may be timed for the complete set of questions or given a certain time to answer each question/statement. Once completed, the score may be automatically provided to the user, along with any other information, such as comparison to other scores from a similar age or age group.

As noted, these are just examples of how a user can easily manage data and cause desired actions to be performed on selected items by simply moving items to specific locations on a user display.

Figure 4:
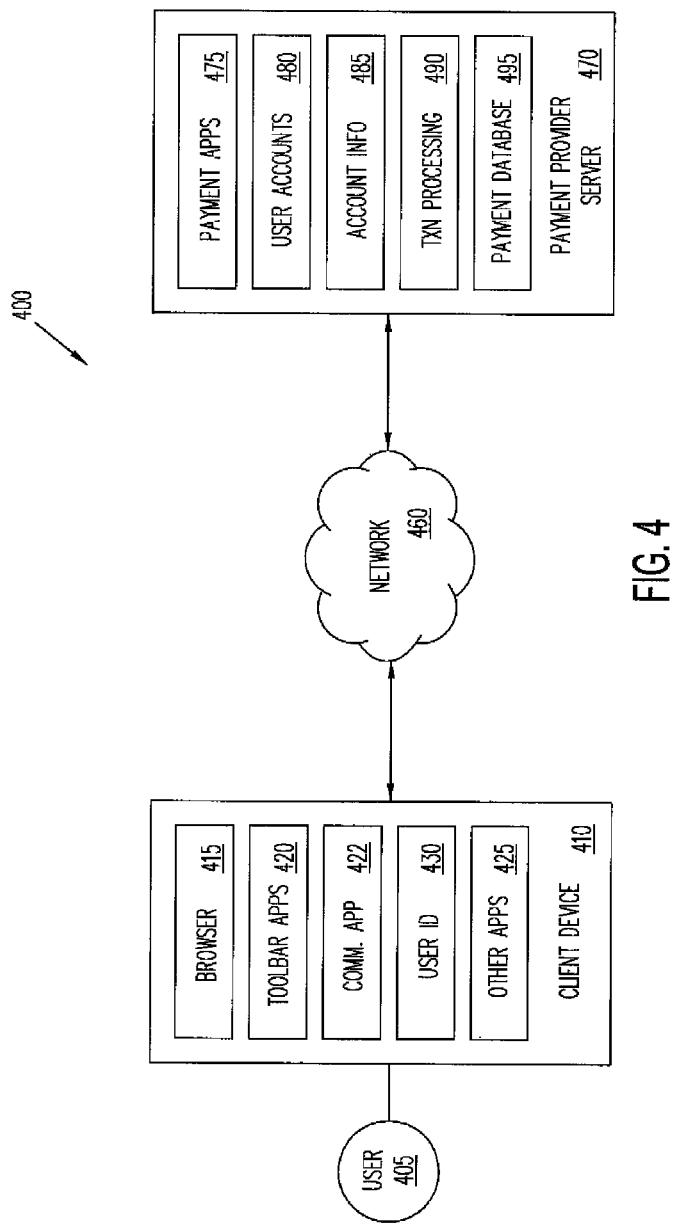
FIG. 4 is block diagram of a networked system suitable for implementing the process described herein according to an embodiment.

FIG. 4 is a block diagram of a networked system 400 configured for presenting a payment tree display and processing payments from the tree, such as described above, in accordance with an embodiment of the invention. System 400 includes a user device 410 and a payment provider server 470 in communication over a network 460. Payment provider server 470 may be maintained by a payment provider, such as PayPal, Inc. of San Jose, Calif. Although a payment provider device is shown, the server may be managed or controlled any suitable service provider that manages data. A user 405 utilizes user device 410 to view account information and perform transactions, manage data, and/or process data using payment provider server 470. Note that transaction, as used herein, refers to any suitable action performed using the user device, including payments, transfer of information, display of information, management of information, etc. Although only one server is shown, a plurality of servers may be utilized. Exemplary servers may include, for example, standalone and enterprise-class servers operating a server OS such as a MICROSOFT® OS, a UNIX® OS, a LINUX® OS, or other suitable server-based OS. One or more servers may be operated and/or maintained by the same or different entities.

User device 410 and payment provider server 470 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

User device 410 may be implemented using any appropriate hardware and software configured for wired and/or wireless communication over network 460. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 410 may include one or more browser applications 415 which may be used, for example, to provide a convenient interface to permit user 405 to browse information available over network 460. For example, in one embodiment, browser application 415 may be implemented as a web browser configured to view information available over the Internet, such as user payees and payers and information other from the payment provider. User device 410 may also include one or more toolbar applications 420 which may be used, for example, to provide client-side processing for performing desired tasks in response to operations selected by user 405. In one embodiment, toolbar application 420 may display a user interface in connection with browser application 415 as further described herein.

User device 410 may further include other applications 425 as may be desired in particular embodiments to provide desired features to user device 410. For example, other applications 425 may include security applications for implementing client-side security features, programmatic client applications for interfacing with appropriate application programming interfaces (APIs) over network 460, or other types of applications. Applications 425 may also include email, texting, voice and IM applications that allow user 405 to send and receive emails, calls, and texts through network 460, as well as applications that enable the user to communicate and transfer information through and with the payment provider as discussed above. User device 410 includes one or more user identifiers 430 which may be implemented, for example, as operating system registry entries, cookies associated with browser application 415, identifiers associated with hardware of user device 410, or other appropriate identifiers, such as used for payment/user/device authentication. In one embodiment, user identifier 430 may be used by a payment service provider to associate user 405 with a particular account maintained by the payment provider. A communications application 422, with associated interfaces, enables user device 410 to communicate within system 400.

Payment provider server 470 may be maintained, for example, by an online payment service provider which may provide information to and receive information from user 405, such as for making payments. In this regard, payment provider server 470 includes one or more payment applications 475 which may be configured to interact with user device 410 over network 460 to facilitate sending payments from user 405 of user device 410.

Payment provider server 470 also maintains a plurality of user accounts 480, each of which may include account information 485 associated with consumers, merchants, and funding sources, such as credit card companies. For example, account information 485 may include private financial information of users of devices such as account numbers, passwords, device identifiers, user names, phone numbers, credit card information, bank information, identification cards, and photos which may be used to facilitate transactions by user 405.

A transaction processing application 490, which may be part of payment application 475 or separate, may be configured to receive information from a user device for processing and storage in a payment database 495. Transaction processing application 490 may include one or more applications to process information from user 405 for processing a payment or transfer using various selected funding instruments or cards. As such, transaction processing application 490 may store details of payment transfer from individual users, including funding source(s) used, credit options available, etc, to other individuals or entities. Payment application 475 may be further configured to determine the existence of and to manage accounts for user 405, as well as create new accounts if necessary, such as the set up and management payments by the user.

Figure 5:
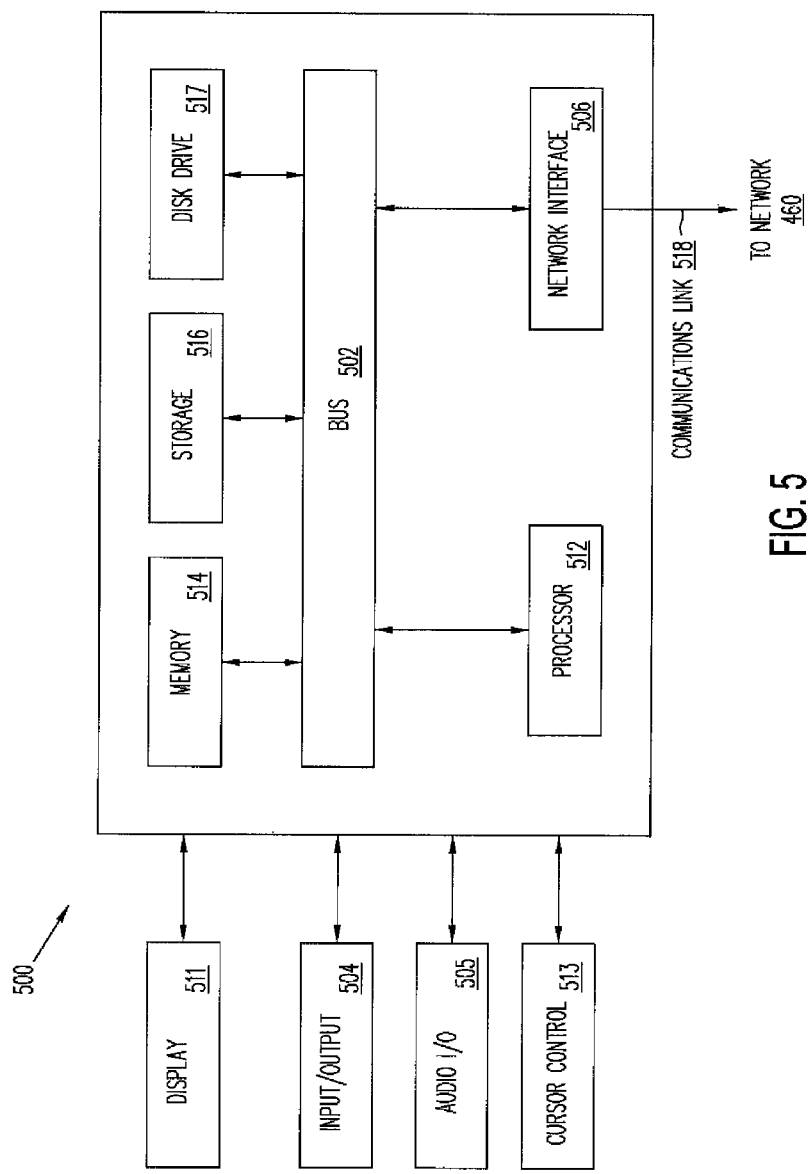
FIG. 5 is a block diagram of a computer system suitable for implementing one or more components in FIG. 4 according to one embodiment.

FIG. 5 is a block diagram of a computer system 500 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The payment provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a payment provider server via network 460. In one embodiment, the transmission is wireless, although other transmission mediums and methods may also be suitable. A processor 512, which can be a micro-controller, digital signal processor (DSP), or other processing component, processes these various signals, such as for display on computer system 500 or transmission to other devices via a communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common fauns of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing user account information; and
   one or more hardware processors coupled to the non-transitory memory and configured to read instructions from the non-transitory memory to cause the system to perform operations comprising:
   communicating electronic data to a user device to enable an interface of the user device to display a list of items along a vertical direction and a plurality of groups along a horizontal direction on the interface, wherein each item extends along the horizontal direction such that a first area of each item with first alphanumeric characters aligns with a first group of the plurality of groups and a second area of each item with second alphanumeric characters aligns with a second group of the plurality of groups;
   based on receiving a first input to the first area with the first alphanumeric characters of a first item from the list of items, performing a full refund action of a first user account associated with the first group for the first item; and
   based on receiving a second input to the second area with the second alphanumeric characters of a second item from the list of items, performing a partial refund action of a second user account associated with the second group for the second item.

2. The system of claim 1, wherein a third area of each item aligns with a third group of the plurality of groups, and wherein the one or more hardware processors is configured to cause the system to perform further operations comprising:
receiving a third input to the third area of the first time; and
performing a third action associated with the third group for the first time; and
causing the first item to be displayed with a shade based at least on the third action performed.

3. The system of claim 1, wherein the interface is a touch-screen display.

4. The system of claim 1, wherein the one or more hardware processors is configured to cause the system to perform further operations comprising receiving a filter request from the interface and filtering the list of items based on the filter request.

5. The system of claim 1, wherein performing the full refund action is automatic based on the first input received.

6. A non-transitory machine-readable medium having stored thereon machine-readable instructions executable to cause a machine to perform operations comprising:
communicating electronic data to a user device to enable an interface of the a user device to display a list of items along a vertical direction and a plurality of groups along a horizontal direction on the interface, wherein each item extends along the horizontal direction such that a first area of each item with first alphanumeric characters aligns with a first group of the plurality of groups and a second area of each item with second alphanumeric characters aligns with a second group of the plurality of groups;
based on receiving a first input to the first area with the first alphanumeric characters of a first item from the list of items, performing a full refund action of a first user account associated with the first group for the first item; and
based on receiving a second input to the second area with the second alphanumeric characters of a second item from the list of items, performing a partial refund action of a second user account associated with the second group for the second item.

7. The non-transitory computer readable medium of claim 6, wherein a third area of each item aligns with a third group of the plurality of groups, and wherein the machine-readable instructions are executables to cause the machine to perform further operations comprising:
receiving a third input to the third area of the first item; and
performing a third action associated with the third group for the first item; and
causing the first item to be displayed with a shade based at least on the third action performed.

8. The non-transitory computer readable medium of claim 6, wherein the interface is a touch-screen display.

9. The non-transitory computer readable medium of claim 6, wherein the machine-readable instructions are executable to cause the machine to perform further operations comprising receiving a filter request and filtering the list of items based on the filter request.

10. The non-transitory computer readable medium of claim 6, wherein performing the partial refund action is automatic based on the second input received.

11. A method comprising:
communicating, by a hardware processor of a service provider, electronic data to a user device to enable an interface of the user device to display a list of items along a vertical direction and a plurality of groups along a horizontal direction on the interface, wherein each item extends along the horizontal direction such that a first area of each item with first alphanumeric characters aligns with a first group of the plurality of groups and a second area of each item with second alphanumeric characters aligns with a second group of the plurality of groups;
based on receiving a first input to the first area with the first alphanumeric characters of a first item from the list of items, performing a full refund action of a first user account associated with the first group for the first item; and
based on receiving a second input to the second area with the second alphanumeric characters of a second item from the list of items, performing a partial refund action of a second user account associated with the second group for the second item.

12. The method of claim 11, wherein a third area of each item aligns with a third group of the plurality of groups, the method further comprising:
receiving a third input to the third area of the first item; and
performing a third action associated with the third group for the first item; and
causing the first item to be displayed with a shade based at least on the third action performed.

13. The method of claim 11, wherein the interface is a touch-screen display.

14. The method of claim 11, further comprising receiving a filter request and filtering the list of items based on the filter request.

15. The method of claim 11, wherein performing the full refund action is automatic based on the first input received.

* * * * *